UNITED STATES PATENT OFFICE.

ISAAC LIFSCHÜTZ, OF HAMBURG, GERMANY.

PROCESS OF OBTAINING OXYCHOLESTERIN.

1,284,724.

Specification of Letters Patent. Patented Nov. 12, 1918.

No Drawing. Application filed February 24, 1917. Serial No. 150,852.

*To all whom it may concern:*

Be it known that I, ISAAC LIFSCHÜTZ, a subject of the German Emperor, and residing at Hamburg, Germany, have invented certain new and useful Improvements in Processes of Obtaining Oxycholesterin, of which the following is a specification.

Among the great number of neutral and stable chemical compositions heretofore known resulting from the oxidation of cholesterin, only oxycholesterin ($C_{27}H_{46}O_2$ according to best authority) shows the characteristic optical and chemical features and reactions of cholesterin. All these compositions are obtained by oxidizing cholesterin with means of vigorous action, such as nitric acid, chromic acid, permanganates and the like, the actions of which generally do not stop with the formation of oxy-cholesterin.

The ozonid of cholesterin, obtained by using substances of rather weak action, is quite different from oxy-cholesterin. While neutral oxy-cholesterin is quite stable, the ozonid on the contrary is most unstable and decomposable, and therefore must be prepared and isolated with great care.

One of the characteristic reactions of oxy-cholesterin, by which also its formation is easily recognized, is the following one:

If a few milligrams of cholesterin dissolved in 2 or 3 cubic centimeters of glacial acetic acid are boiled up once or twice with addition of about an equal quantity of a more or less mild acting peroxid having care to cool the mixture at once, by the adding of 5 to 8 drops of sulfuric acid, the noted intensive color and spectral reaction of the oxy-cholesterin is obtained. Therefore important quantities of oxy-cholesterin are formed by this operation, which can also be isolated. (*Berichte der Deutschen Chem. Ges.* vol. 41, p. 252 ff.) If on the contrary this reaction is carried out by dissolving the cholesterin under exactly the same conditions in other substances than glacial acetic acid, for instance chloroform or benzol, the solutions on adding sulfuric acid remain quite colorless.

Therefore the oxidizing agent did not work in the latter case and indeed it is possible to regain the cholesterin unchanged from this mixture by a suitable separation from the peroxid.

Having studied exactly the action of oxidizing agents on cholesterin under the most varied conditions, the yielding of oxy-cholesterin turned out to be greatly increased by using other solvents and boiling for a longer time.

On verifying the causes, why the reactions took such a different course, it was proved that the indifference of the solvents has a more or less inferior influence. A more important point is the boiling-point of the solvent or of the solution, in other words, the temperature at which the reaction takes place. For a rational production of the oxycholesterin the using of neutral solvents boiling at less than 100° (212° F.), even when not miscible with water, proved to be chemically and technically advantageous, the best ones being carbon compounds containing chlorin. Thereby the duration of the reaction stands in inverse proportion to the height of the boiling point of the solvent.

It is to be remarked that in both cases, with the noted process with glacial acetic acid as with the new proceeding with other solvents, cholesterin becomes oxidized, trifling quantities excepted. The difference is only to be found in the progress of the reaction, the direction of which was not to be foreseen. Only the exhaustive comparing experiments proved the following:

In working with neutral solvents, by far the prevailing part of the product of the oxidation consists of oxy-cholesterin, while according to the acetic acid process the quantity of by-products predominates. Thus only little oxy-cholesterin is formed and its isolation and purification are rendered extremely difficult.

Some examples with chloroform and carbon tetrachlorid as solvents, the boiling points of which differ about 20° C. (36° F.) follow:

1. Two parts by weight of cholesterin are dissolved in 100 volumes of chloroform, mixed with 2 parts by weight of any superoxid (for instance benzoylsuperoxid) and boiled with reflux-condenser. While boiling, samples have to be taken frequently, whose content of oxy-cholesterin is exactly verified in a spectrometrical way. After about 8 to 10 hours the content of oxycholesterin generally amounts to 90 to 95% of the employed cholesterin. After this point has been reached, the chloroform is distilled off and the oxy-cholesterin is isolated and purified—as known—by treating the residue containing the oxy-cholesterin and the other resulting products and the residual oxidizing agent with alcoholic potash and extracting the neutral mass with methyl alcohol.

2. If instead of chloroform, carbon tetrachlorid is used, the desired end of the reaction is attained within 2 or 3 hours instead of 8 to 10.

After this process 75 to 80% of pure oxy-cholesterin are obtained from the weight of the cholesterin applied, while 15 to 20% remain in the cleaning-fluids, which likewise can be gained in a profitable way. On the contrary, the acetic acid process generally produces only 20 to 25% of pure oxy-cholesterin. Besides the boiling-point of the reaction-mixture may be increased or reduced by its content of solid substances and thus the duration of the reaction according to desire may be extended or accelerated.

The new process shows a further advantage in the circumstance that the solvents can be regained by distillation in a simple way, which is practically impossible in the acetic acid process, even without considering the considerable technical difficulty arising by working on a larger scale in a factory. As solvents not only chemically homogeneous liquids may be applied, but also mixtures of liquids of differing boiling points can be used; however they are to be selected in a manner, that their mixture boils below 100° C. (212° F.) Additions of acids act favorably on the reaction.

As an oxidizing agent it is advisable to use mildly acting means as peroxids, compounds of ferric oxid, or the like. Also blood-powder may in this sense be considered as a mild means of oxidation (*Comp. Zeitschrift für Physiol. Chem.*, vol. 93, p. 209 ff.)

The oxy-cholesterin is to be used for medicinal and cosmetic purposes.

What I do claim and desire to secure by United States Patent is:

1. The new process of producing oxy-cholesterin comprising dissolving cholesterin in solvents or mixtures of solvents having a boiling point below 100° C., adding an oxidizing agent having a mild oxidizing action, and heating.

2. The new process of producing oxy-cholesterin comprising dissolving cholesterin in solvents or mixtures of solvents having a boiling point below 100° C., adding an oxidizing agent having a mild oxidizing action, adding an acid, and heating.

3. The new process of producing oxy-cholesterin comprising dissolving cholesterin in a neutral solvent having a boiling point below 100° C., adding an oxidizing agent having a mild oxidizing action, and heating.

4. The new process of producing oxy-cholesterin comprising dissolving cholesterin in a liquid carbon-chlorin-compound, having a boiling point below 100° C., adding an oxidizing agent having a mild oxidizing action, and heating.

5. The new process of producing oxy-cholesterin comprising dissolving cholesterin in solvents or mixtures of solvents having a boiling point below 100° C., adding a peroxid having a mild action, and heating.

In testimony whereof I hereunto affix my signature in the presence of two witnesses.

ISAAC LIFSCHÜTZ.

Witnesses:
 FRANCIS R. STEWART,
 J. C. McNALLY.